Nov. 5, 1935.  W. R. FLUEGEL  2,019,958
STEERABLE SLED
Filed Nov. 26, 1934
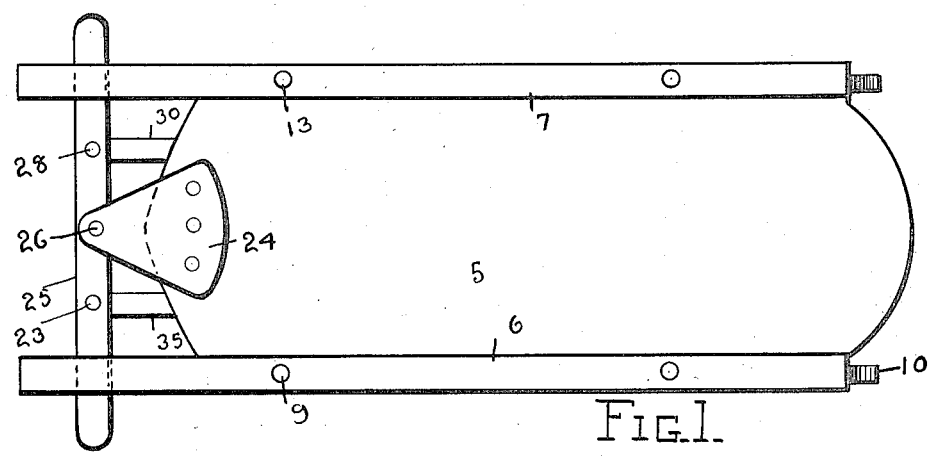
Fig.1.
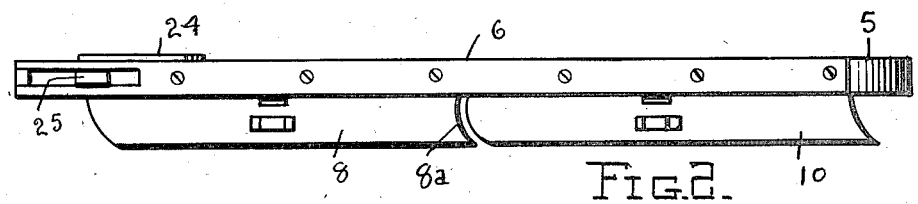
Fig.2.
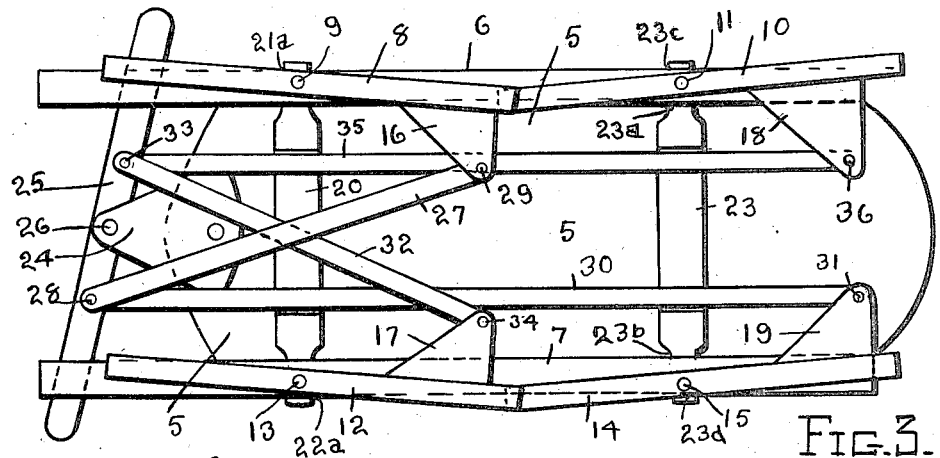
Fig.3.
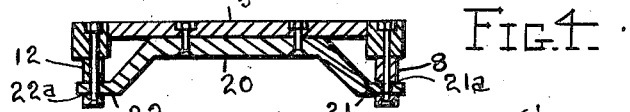
Fig.4.
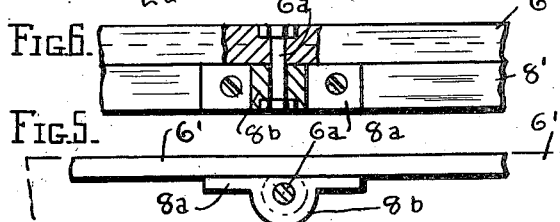
Fig.6.
Fig.5.
INVENTOR
William R. Fluegel Patented Nov. 5, 1935

2,019,958

UNITED STATES PATENT OFFICE 2,019,958

STEERABLE SLED

William R. Fluegel, Astoria, N. Y.

Application November 26, 1934, Serial No. 754,702

2 Claims. (Cl. 280—22)

This invention relates to improvements in sleds and its leading object is to provide a sled with runners which may be steered, so that the rider can turn sharp corners, without danger, and hold the sled to a straight-away course when so desired.

Another object of the invention is the provision of a sled with runners on each side thereof, each one of which is divided into sections pivotally supported in place, and the further provision of means for simultaneously steering the runners, so that the two forward runner sections will turn in one direction and the two rear runner sections will turn in another direction.

A still further object of the invention is the provision of a sled with steerable runner sections, and steering means consisting of a main cross lever or bar, a pair of pull and push links or bars connected to the rear runner sections, and another pair of pull and push bars connected to the forward runner sections, all of the pull and push bars or links being pivotally connected with the cross lever or bar, so that when the rider turns this lever the runner sections will swing in the desired direction.

Having described the general objects of my invention, further objects consist in the combinations, constructions and arrangement of parts, clearly described in the following specification and fully illustrated in the accompanying drawing, in which:

Fig. 1 is a plan view from the rider's side of the sled.

Fig. 2 is a side view thereof.

Fig. 3 is a bottom plan view, showing the runner sections in steering relation to the sled.

Fig. 4 is a cross sectional view, taken on line 4—4 of Fig. 1, looking in the direction of the arrows.

Fig. 5 is a detail plan view of a modified connection.

Fig. 6 is a side elevation thereof partly in section.

Referring to the accompanying drawing illustrating the practical construction of the invention 5 designates a platform which is connected along its opposite longitudinal edges to the reinforcing bars 6 and 7, arranged in parallel relation to each other.

To the bar 6 the forward runner section 8 is pivoted by the pin or bolt 9, at the forward portion of said bar 6, and at the rearward portion of the bar 6 the rear runner section 10 is pivotally connected by the bolt 11. The forward end of the runner section 8 is curved rearwardly, and the rear end of said runner section is formed with a rearwardly directed concave curve 8a, adapted to slightly overlap the rounded forward end of the rear runner section 10.

To the frame or platform bar 7 the forward runner section 12 is pivoted by the pin or bolt 13, and this runner section is constructed in duplication of the runner section 8. To the platform bar 7 the rear runner section 14, similar to the runner section 10, is pivoted by the bolt 15.

The rear end of the forward runner section 8 is equipped with a rigid arm 16, and the rear end of the forward runner section 12 is also equipped with a similar rigid arm 17. These two arms project toward each other and are located in line with each other.

The rear end of the rear runner section 10 is equipped with a rigid lateral arm 18, and the rear end of the opposite rear runner section 14 is equipped with a similar rigid lateral arm 19, which are located in line with each other and which project toward each other.

Across the forward end of the platform and rigidly attached to the lower side thereof is a cross bar 20, the terminal portions of which are shaped so that they project downwardly and outwardly, and provide horizontal bearings 21 and 22 at the ends thereof, which project through openings 21a and 22a formed in the forward runner sections, through which the pin bolts 9 and 13 extend, so that the runners will be supported against accidental displacement by means of the cross brace or bar.

A similar brace or bar 23 is attached rigidly across the rear end of the platform, against its lower side, and its downwardly and outwardly deflected outer portions 23a and 23b are provided with end bearings 23c and 23d, which fit into openings of the rear runner sections, in the same manner as is shown in cross section in Fig. 4. The pivot bolts 11 and 15 extend through the terminal or end bearings of the cross brace or bar 23.

To the forward end of the platform 5 a bearing device 24, which may consist of a single casting, or a pair of similar plates, is attached. This bearing device or member extends forwardly of the platform and is bifurcated at its forward end to receive the central portion of the cross lever 25, which is pivotally connected thereto by means of the pivot bolt 26.

On one side of the pivot bolt 26 a pull and push link or bar 27 is connected to the cross lever 25 by means of the pivot 28, and the rear end of this push and pull link or bar is pivotally connected to the lateral arm 16 by means of the pivot 29. Another and longer push and pull bar or link 30 is pivotally connected to the cross or steering lever 25 by means of the pivot bolt 28, at its front end, and at its rear end is pivotally connected to the lateral arm 19 by the pin 31. The other arm of the lever is pivotally connected to the short push and pull link or bar 32 by the pin 33, and the rear end of this link or bar is pivoted on the lateral arm 17 by the pin 34. The two short links 27 and 20 cross each other but are not pivotally or otherwise connected to each other at the point where they intersect. Another long link or bar 35 is connected to the steering cross lever by the pivot 33 and at its rear end is pivoted on the lateral arm 18 by the pin 36.

When the sled is sliding over ice or snow the rider can easily control the direction of turning by operating the cross lever, which causes the forward runner sections to turn in a common direction, and the rear runner sections to turn in a common but different direction, so that both ends of the sled will be subjected to the steering action which the oppositely deflected runner sections develop.

This construction gives instant control over steering and permits the rider to steer the sled around sharp bends, in complete safety, without danger of being upset. As both runners are subject to pivotal deflection and the forward runner sections can be shifted to guide the forward end in the desired direction, while the rear runner sections are shifted to reduce the resistance to turning movement, the effort required to steer a weighted sled moving at fast speed will be comparatively moderate.

I claim as new and patentable:

1. A sled consisting of a platform, forward runner sections pivoted on the platform, rear runner sections pivoted on the platform in line with the forward runner sections, a lever pivoted on the platform, push and pull links connected to the lever and to the forward runner sections and in crosswise relation to each other, and parallel push and pull links connected to the lever and to the rear runner sections.

2. A sled consisting of a platform, forward side runner sections pivoted to the platform, rear runner sections pivoted to the platform, a cross brace on the platform having its ends pivotally connected with the forward runner sections, a cross brace on the platform having its ends pivotally connected with the rear runner sections, a lever pivoted to the platform, the forward runner sections having inwardly projecting arms in opposed relation located on their rear ends, the rear runner sections having inwardly projecting arms located on their rear ends, parallel link members connecting the lever to the arms of the rear runner sections, and link members pivoted to the lever and crossing each other and pivoted to the arms of the forward runner sections, whereby the rear runner sections will be turned in one direction and the forward runner sections will be turned in opposite sections.

WILLIAM R. FLUEGEL.